United States Patent [19]

Nimura et al.

[11] Patent Number: 4,882,696
[45] Date of Patent: Nov. 21, 1989

[54] NAVIGATION APPARATUS

[75] Inventors: Mitsuhiro Nimura; Shoji Yokoyama, both of Anjo, Japan

[73] Assignees: Aisin Aw Co., Ltd.; Kabushiki Kaisha Shinsangyokaihatsu, both of Aichi, Japan

[21] Appl. No.: 217,532

[22] Filed: Jul. 11, 1988

[30] Foreign Application Priority Data

Oct. 7, 1987 [JP] Japan ................... 53-173613

[51] Int. Cl.[4] .............................. G06F 15/50
[52] U.S. Cl. ..................... 364/449; 364/444; 73/178 R; 340/988
[58] Field of Search ............... 364/443, 444, 449, 436, 364/460, 424.02; 73/178 R; 340/988, 990, 995; 369/21

[56] References Cited

U.S. PATENT DOCUMENTS

| 4,291,373 | 9/1981 | Mizote et al. | 369/21 |
| 4,490,717 | 12/1984 | Saito | 364/460 |
| 4,630,209 | 12/1986 | Saito et al. | 364/449 |
| 4,679,147 | 7/1987 | Tsujii et al. | 364/449 |
| 4,688,176 | 8/1987 | Hirata | 364/449 |
| 4,774,671 | 9/1988 | Itoh et al. | 364/444 |
| 4,812,845 | 3/1989 | Yamada et al. | 340/995 |

Primary Examiner—Gary Chin
Attorney, Agent, or Firm—Varndell Legal Group

[57] ABSTRACT

A navigation apparatus for navigating a vehicle in accordance with a preset course while measuring distance travelled and steering angle has voice track indication means in which voice track indications corresponding to the distance remaining to an intersection at which the next turn is to be made are outputted as the intersection is approached. When the distance from this intersection to the next intersection requiring a turn is less than a predetermined value, a voice track indication pointing out a lane into which the vehicle should be steered following the turn at the former intersection is outputted after the final voice track indication given just before the vehicle reaches this intersection. When it is required that a turn be made at the latter intersection immediately after the turn at the former intersection, the lane information for the turn at the latter intersection is outputted before the vehicle is turned at the former intersection. This makes it possible for the driver to steer the vehicle to the lane appropriate for the turn at the latter intersection while the vehicle is being turned at the former. Accordingly, in situations where it is required to make the turn at the latter intersection immediately after effecting the turn at the former, the driver can make the proper maneuvers smoothly and without haste.

5 Claims, 6 Drawing Sheets

| INTERSECTION NO. | INTERSECTION NAME | SMALLEST NO. OF ROAD HAVING THIS INTERSECTION AS STARTING POINT | SMALLEST NO. OF ROAD HAVING THIS INTERSECTION AS END POINT | TRAFFIC SIGNAL? |
|---|---|---|---|---|
| I | KANDA | 1 | 2 | YES |
| II | YUSHIMA | 2 | 1 | YES |
| III | — | 4 | 3 | NO |
| IV | — | 6 | 5 | |

FIG. 4C

| ROAD NO. | STARTING POINT | END POINT | NO. OF ROAD HAVING SAME STARTING POINT | NO. OF ROAD HAVING SAME END POINT | ROAD WIDTH | PROHIBITION ① | PROHIBITION ② | GUIDANCE UNNECESSARY | PHOTOGRAPH NO. | NUMBER OF NODES | LEADING ADDRESS OF NODE SERIES DATA | LENGTH |
|---|---|---|---|---|---|---|---|---|---|---|---|---|
| 1 | I | II | 7 | 4 | 1 | — | — | 3 | 1 | 15 | 100 | |
| 2 | II | I | 3 | 8 | 1 | — | — | 7 | 2 | 13 | 200 | |
| 3 | II | III | 2 | 3 | 2 | — | — | 5 | 3 | 9 | 300 | |
| 4 | III | II | 5 | 6 | 2 | — | — | 2 | 4 | 20 | 500 | |
| 5 | III | IV | 4 | 7 | 2 | 6 | — | 8 | 5 | 25 | 600 | |
| 6 | IV | II | 8 | 1 | 1 | 3 | 2 | — | 6 | 30 | 700 | |
| 7 | I | IV | 1 | 5 | 0 | — | — | — | 7 | 9 | 800 | |
| 8 | IV | I | 6 | 2 | 0 | — | — | 1 | 8 | 3 | 900 | |

FIG. 4D

| ADDRESS | EAST LONGITUDE | NORTH LATITUDE | ATTRIB-UTE |
|---|---|---|---|
| | 135.5 | 35.1 | 0 1 |
| | 135.6 | 35.2 | 0 1 |
| 100 | | | |
| 200 | | | |

FIG. 5

| INTERSECTION NAME |
|---|
| INTERSECTION NO. |
| PHOTOGRAPH NO. |
| ANGLE |
| DISTANCE |
| INTERSECTION NAME |

FIG. 6

| VOICE TRACK NO. | VOICE TRACK CONTENTS |
|---|---|
| 1 | ONE KILLOMETER TO THE INTERSECTION |
| 2 | 300 METERS TO THE INTERSECTION |
| 3 | TURN RIGHT AT THE NEXT INTERSECTION |
| 4 | TURN LEFT AT THE NEXT INTERSECTION |
| 5 | BEAR RIGHT AFTER TURNING |
| 6 | BEAR LEFT AFTER TURNING |
| 7 | ENTER RIGHT LANE AFTER TURNING |
| 8 | ENTER LEFT LANE AFTER TURNING |
| ⋮ | ⋮ |

NAVIGATION APPARATUS

BACKGROUND OF THE INVENTION

This invention relates to an apparatus for navigating a vehicle in accordance with a course set before travel starts. More particularly, the invention relates to a system for outputting intersection distance information in a navigation apparatus which provides traffic lane information after the vehicle has turned at an intersection.

Recent years have seen extensive development of vehicular navigation systems in which a course is preset before travel starts and the driver is given course information in accordance with the preset course.

When the driver is guided along the preset course, the conventional navigation apparatus merely displays a map on the screen of a CRT and superimposes the course on the map. Accordingly, observes the course displayed on the map and decides at which intersection the next turn is to be made.

However, with the conventional arrangement in which the driver determines the intersection by observing the course on the map, the driver is constrained to read his present position, the distance to the intersection and characterizing features near the intersection from the course display while driving the vehicle, and the driver must visually identify the intersection at which the next turn is to be made. This usually requires that the driver give his utmost attention to the task of identifying the intersection. Accordingly, since the driver's concentration is focused on identifying the proper intersection, he cannot give due consideration to, and is not aware of, the manner in which the vehicle should be steered after the turn at this intersection is made. If one intersection requiring a turn immediately follows another, the vehicle must be steered into the proper lane immediately after the turn at the first intersection is made. With the conventional system, however, the driver cannot determine which is the proper lane. This can cause the driver to make a dangerous lane change or to completely pass through the second intersection without making the turn.

SUMMARY OF THE INVENTION

Accordingly, an object of the present invention is to provide a navigation apparatus in which a driver is so guided as to be capable of steering the vehicle along the optimum course even when there is a very short distance between intersections requiring turns.

Another object of the invention is to provide a navigation apparatus which provides appropriate intersection information before a turn is made at the first intersection.

In accordance with the invention, the foregoing objects are attained by providing a navigation apparatus for navigating a vehicle in accordance with a preset course while measuring distance travelled and steering angle, characterized by having voice track indication means in which voice track indications corresponding to the distance remaining to an intersection at which the next turn is to be made are outputted as the intersection is approached, wherein when the distance from this (first) intersection to the next (second) intersection requiring a turn is less than a predetermined value, voice track indication pointing out a lane into which the vehicle should be steered following the turn at the first intersection is outputted after the final voice track indication given just before the vehicle reaches the first intersection.

In accordance with the invention as described above, when it is required that a turn be made at the second intersection immediately after the turn at the first intersection, the lane information for the turn at the second intersection is outputted before the vehicle is turned at the first intersection. This makes it possible for the driver to steer the vehicle to the lane appropriate for the turn at the second intersection while the vehicle is being turned at the first intersection. Accordingly, in situations where it is required to make the turn at the second intersection immediately after effecting the turn at the first, the driver can make the proper maneuvers smoothly and without haste.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENT

An embodiment of the present invention will now be described with reference to the drawings.

As set forth above, a vehicular navigation apparatus provides a driver with course guidance in accordance with a course set before the start of travel. A feature of the present invention is that such a navigation apparatus is provided with means for outputting voice tracks. With regard to course guidance relating to intersections, the arrangement of the invention is such that voice tracks can be played to recite messages such as "ONE KILOMETER TO THE INTERSECTION", "300 METERS TO THE INTERSECTION", "TURN RIGHT AT THE NEXT INTERSECTION" when the vehicle approaches an intersection at which the next turn is to be made, thus providing the driver with an audible indication of the distance to the intersection and the direction of the turn. If there is but a short distance between the upcoming intersection requiring the turn and the intersection at which the next turn is to be made, voice tracks can be played to recite messages such as ① "BEAR RIGHT AFTER TURNING", ②"BEAR LEFT AFTER TURNING", ③ "ENTER THE RIGHT LANE AFTER TURNING", ④ "ENTER THE LEFT LANE AFTER TURNING"when the vehicle approaches the upcoming intersection requiring the turn. By way of these voice tracks, the driver is provided with traffic lane information concerning the lane to be entered after making the first turn. Voice quality is changed to distinguish between the voice tracks, as by outputting the information relating to the right-hand direction [①, ③] using a male voice and the information relating to the left-hand direction [②, ④] using a female voice. Thus, if the driver should fail to hear the details of the message when it is announced, he will still be able to ascertain the lane information by recalling whether the voice was that of a male or female.

With the arrangement of the invention, therefore, information relating to a lane which should be entered after a turn is made at an intersection is obtained before the turn. Accordingly, even if a course requires that one turn at an intersection be immediately followed by another, the driver is capable of steering the vehicle into the proper lane ahead of time to avoid making a hasty turn at the latter intersection. As a result, the driver is always placed at ease and need not make sudden lane changes or cut into traffic.

A flowchart of processing for outputting the aforementioned lane information will now be described with reference to FIG. 1.

① First, information relating to the intersection at which the next turn should be made is set. This information includes the name of the intersection, the distance to this intersection and the direction in which the vehicle is to travel from this intersection.

② The voice track numbers of previously prepared voice tracks are set based on the distance from the present vehicle position to the intersection requiring the next turn and the direction of travel from this intersection. Also set is the distance to the intersection requiring the next turn and for which the corresponding voice track is to be outputted.

③ It is determined whether the distance to the next voice track playback is zero.

Figure 1:
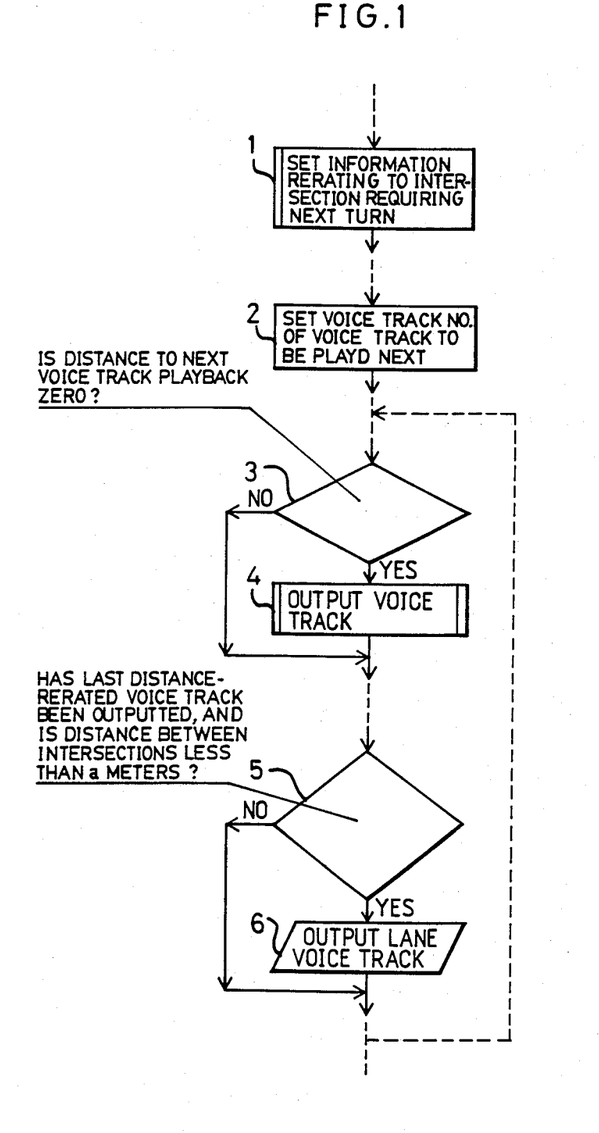
FIG. 1 is a flowchart for describing an embodiment of a method of outputting intersection information in the navigation apparatus of the invention.
Figure 2:
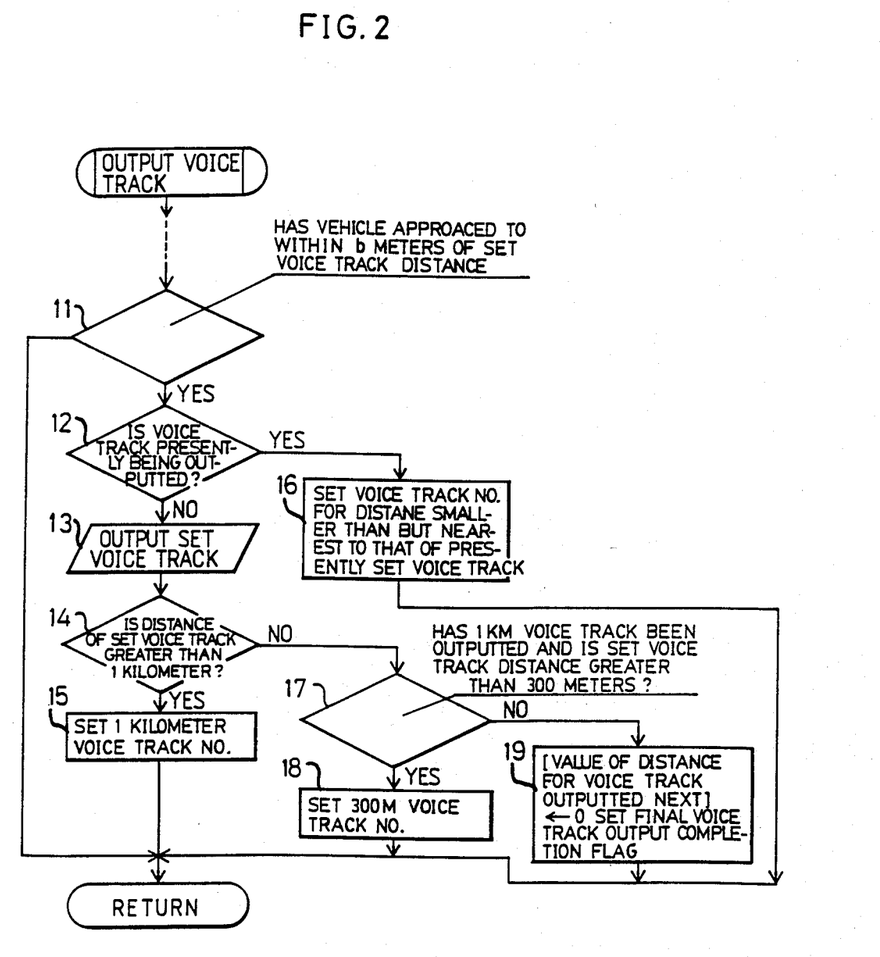
FIG. 2 is a flowchart illustrating the flow of processing for a voice track output routine.

④ If the answer received at step ③ is YES, then the voice track output processing of steps ⑪ through ⑲, which is described below with reference to FIG. 2, is executed.

⑤ If the answer received at step ③ is NO, then it is determined whether the final distance-related voice track has been outputted and the distance between the next two intersections requiring turns is less than a meters.

⑥ If the answer received at step ⑤ is YES, namely if the final voice track concerning distance has been outputted and the distance between the next two intersections requiring turns is short, then a voice track is outputted that relates to lane information conforming to the direction in which the car should be turned to negotiate the latter intersection. If the answer received at step ⑤ is NO, then the program returns to step ③ and the same processing loop is executed again in accordance with the vehicle travel up to the intersection at which the next turn is to be made.

The voice track output processing of step ④ will now be described in detail with reference to the flowchart of FIG. 2.

⑪ It is determined whether the vehicle has approached to within a distance b meters of a set voice track. If the answer is NO, the program returns to the main routine, namely to the processing of step ⑤. If a YES answer is received, the program proceeds to a step ⑫.

⑫ Here it is determined whether a voice track is presently being outputted. If a YES answer is received, a step ⑯ is executed. If a NO answer is received, the program proceeds to a step ⑬.

⑬ Here the set voice track is outputted.

⑭ It is determined whether the distance of the voice track which has been set is greater than 1 km. If the answer is YES, then a 1 km voice track number is set at a step ⑮ and the program returns. If a NO answer is received, a step ⑰ is executed.

⑰ Here it is determined whether the 1 km voice track has been outputted and the distance for a set voice track is greater than 300 m. If the answer is YES, namely if the aforementioned distance is greater than 300 m, a 300 m voice track number is set at a step ⑱ and the program returns. If a NO answer is received, namely if the distance is less than 300 m, the value of the distance for the voice track outputted next is set to zero and a flag indicating completion of the final voice track output is raised at a step ⑲ after which the program returns.

⑯ If a YES answer is received in the processing of step ⑫, namely if a voice track is presently being outputted, a voice track number for a distance smaller than that for the presently set voice track but nearest to this distance is set together with the voice track output distance. The program then returns to the main routine.

Thus, if the distance to the intersection at which the next turn is to be made is more than 1 km, voice tracks reciting the remaining distances of 1 km and 300 m are played in succession while travelling distance is being measured. When the distance to the intersection at which the next turn is to be made is less than 1 km, the voice track for the distance to this intersection is played [step ④]. If the final distance-related voice track has been played and the distance between the abovementioned intersection and the intersection requiring the next turn is less than a meters [YES at step ⑤], then lane information is outputted as by a voice track reciting "BEAR RIGHT AFTER TURNING"[ step ⑥].

Figure 3:
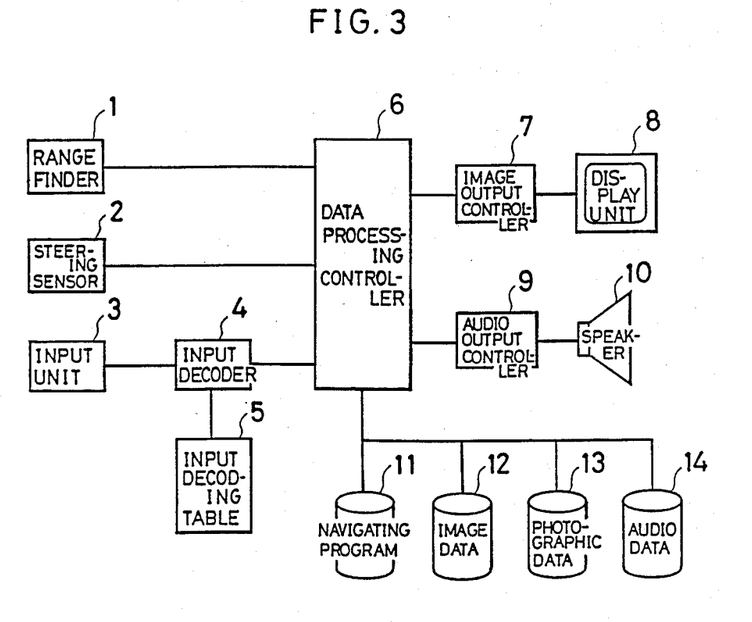
FIG. 3 is a block diagram illustrating an example of the structure of a navigation system to which the intersection information output method of the inventive naviation apparatus is applied.

FIG. 3 illustrates an example of the system configuration of a navigation apparatus which performs the above-described course guidance.

In FIG. 3, the arrangement includes a range finder 1, a steering angle sensor 2, an input unit 3, an input decoder 4, an input decoding table 5, a data processing controller 6, an image output controller 7, a display unit 8, an audio output controller 9, a speaker 10 and files 11 through 14.

The range finder 1 measures the distance travelled by an automotive vehicle. Examples of the range finder 1 include means for detecting and counting the number of revolutions of a wheel, means for detecting acceleration and double-integrating the result, etc. Other measuring means may also be employed. The steering sensor 2 senses whether the vehicle has turned at an intersection. By way of example, the steering sensor 2 employs an optical rotary sensor or a rotating-type variable resistor attached to a rotating part of the steering wheel. The input unit 3 is a joy stick, key or touch-type panel. Alternatively, the input unit 3 can be interlocked with the screen of a display unit 8, and a key or menu can be displayed on the screen to enable inputs to be made from the screen. The input decoder 4 is adapted to decode input data from the input unit 3 while referring to the input decoding table 5. When a course is to be set, for example, the present location of the vehicle and the destination are inputted in the form of codes, where-upon the input decoder 4 effects a conversion into present location data and destination data based on the codes by referring to the input decoding table 5. Accordingly, the input decoding table 5 is set in accordance with the data inputted from the input unit 3. The data processing controller 6 is the brain of the navigation system. When a course has been selected and set at the input unit 3, the controller 6 calls and executes navigation data for this course from the file 11 storing the data.

Each item of navigating data is designed to display an information map, which is in line with the course travelled, on the screen of the display unit 8, project characteristic photographs at intersections and at points along the course, display remaining distances to intersections as well as other guidance information, and give audible information in the form of voice tracks broadcast from the speaker 10. These images, photographs and audio data are stored in files 12 through 14, respectively. The outputting of images to the display unit 8 is controlled by the image output controller 7, and the outputting of audio to the speaker 10 is controlled by the audio output controller 9.

Figure 4A:
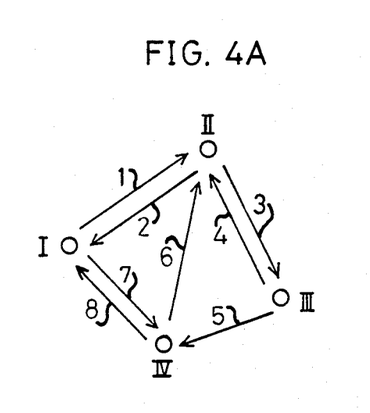
FIGS. 4A through 4D are views illustrating an example of basic data for creating navigation data.

As an example, assume that a road network comprises intersection numbers I–IV and road numbers ①–⑧, as shown in FIG. 4A. In such case, the intersection data will have the data configuration shown in FIG. 4B, the road data will have the data configuration shown in FIG. 4C, and the node series data will have the data configuration shown in FIG. 4D.

Figures 4B, 4C:
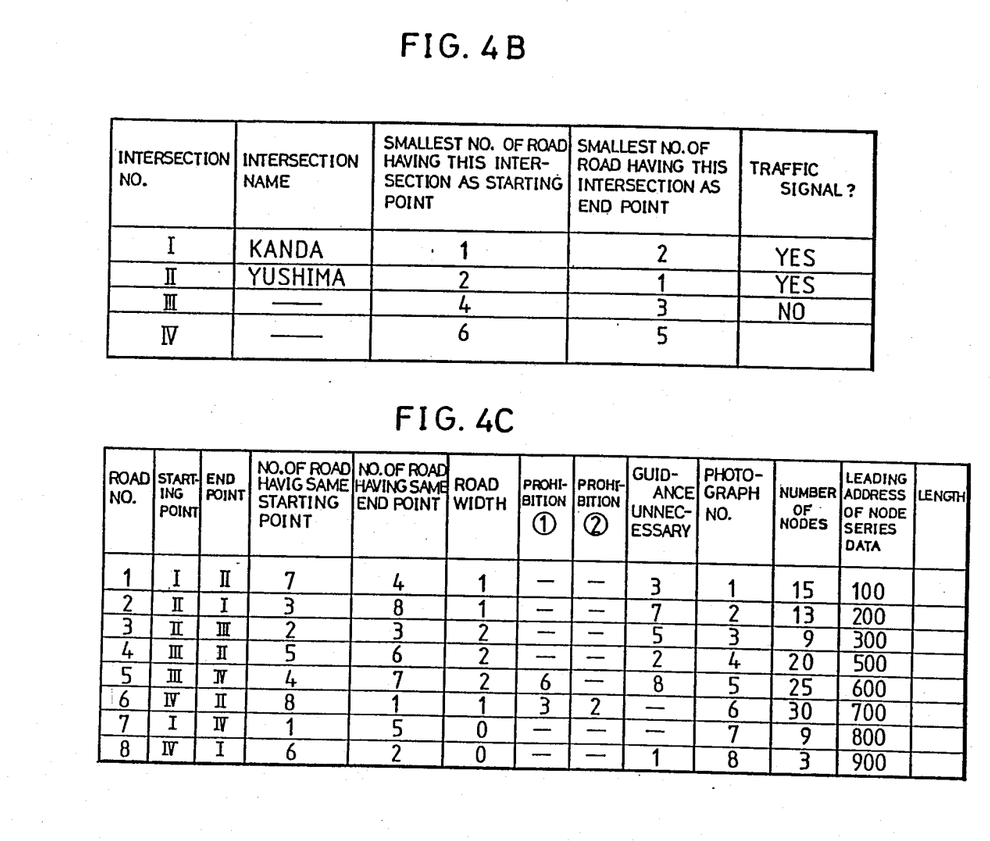

As shown in FIG. 4B, the intersection data comprises intersection names corresponding to the intersections numbers I–IV, road numbers having the smallest numbers among those roads possessing a certain intersection as a starting point, road numbers having the smallest numbers among those roads possessing a certain intersection as an end point, and information indicating whether or not a certain intersection has a traffic signal.

As shown in FIG. 4C, the road data comprises starting and end points, in the form of intersection numbers, of the road numbers ① through ⑧, the numbers of roads having the same starting point, the numbers of roads having the same end point, road width, information relating to prohibitions, information relating to guidance not required, photograph numbers, the numbers of nodes, the leading addresses of node series data, length, etc.

Figure 4D:
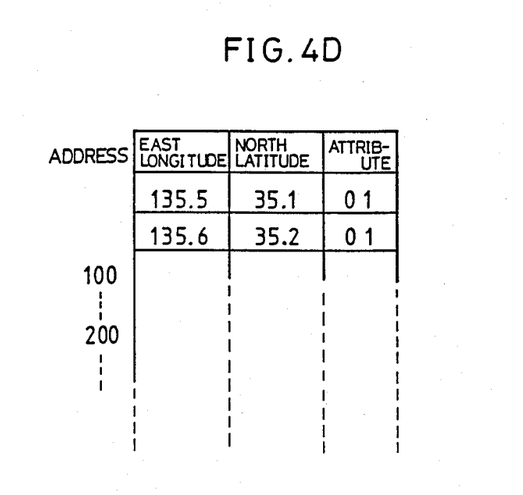

As shown in FIG. 4(D), the node array data comprises information relating to east longitude, north latitude, attributes and the like. The units of the road numbers comprise a plurality of nodes, as is evident from the road data. More specifically, the node data is data relating to one point on a road. If a line connecting nodes is referred to as an arc, a road is expressed by connecting each of a plurality of node arrays by arcs. For example, with regard to road number ①, the road comprises 15 nodes and the leading address of the node array data is 100, based on the road data. Therefore, road number ① is composed of node data having addresses 100 to 114.

Figure 5:
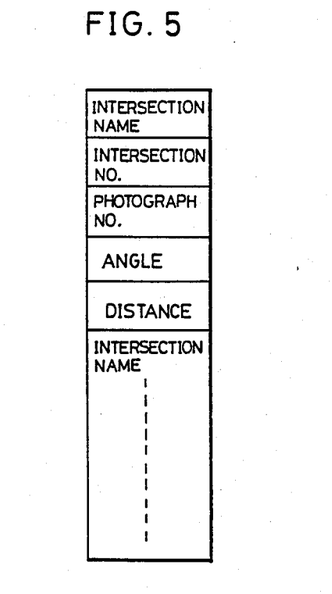
FIG. 5 is a view illustrating an example of loop data constituting navigation data.

Let us take intersection number I as an example. For a course having this intersection as a starting point, first road number ① is retrieved from the starting point information of the intersection point data, then road number ⑦ is retrieved from the road data relating to the road number ①, namely from the column reading "NO. OF ROAD HAVING SAME STARTING POINT". Since the same information for road number ⑦ will, in converse fashion, lead to retrieval of road number ①, one can determine that there are no other road numbers available as peripheral roads. The same will hold true with regard to end points. Further, since road number ⑥ will be prohibited in case of road number ⑤ in the road data, the vehicle will not be able to enter road number ⑥ from road number ⑤ at the intersection number IV shown in FIG. 4A because turns are prohibited at this intersection. The only road that can be entered is the road number ⑧. Accordingly, guidance to road number ⑧ is unnecessary. By providing the road data with road numbers indicative of roads that cannot be entered because of prohibited turns and road numbers indicative of roads for which guidance is not required, the necessary information storage capacity can be reduced and route retrieval can be facilitated. By relying upon such data, peripheral roads from an intersection (with the exception of roads for which entry is forbidden because of prohibited turns or the like) are retrieved, road width, the need or lack of need for guidance and other conditions necessary for computing an ideal route are set, and the optimum route from the designated starting point to the destination is retrieved. In accordance with the retrieved ideal route, route data shown in FIG. 5 is created as navigation data. The route data comprises the intersections, in order of nearness, from the starting point to the destination along the retrieved optimum route.

Figure 6:
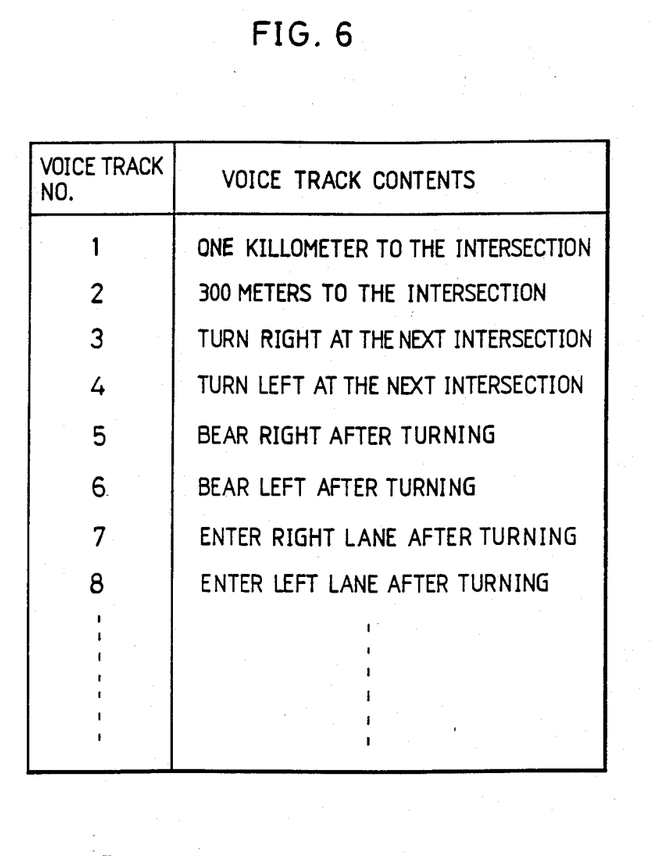
FIG. 6 is a view illustrating an example of a voice track list.

In accordance with the above-described navigation system, the driver selects a course by entering his present location and desired destination from the input unit 3 before travelling. When this has been accomplished, the data processing controller 6 reads and executes the navigating program in file 1 corresponding to this course. In accordance with the course, and on the basis of the measurement information from the range finder 1 and steering sensor 2, the aforementioned execution of the data determines the vehicle, displays the course information map, present location and the like, and informs the driver of characteristic features and intersections along the route, via the display unit 8 and speaker 10. Furthermore, in order to assure the driver that he has not strayed off the course when the distance between intersections is great, for example, the driver may be informed by voice of characterizing features being passed, such as by a voice track reciting "YOU WILL SOON CROSS A BRIDGE", or a photograph of the characterizing feature being passed may be projected on the display screen. Also, a guidance map and the persent location of the vehicle are displayed. When the vehicle approaches an intersection, intersection information is outputted by the display screen and voice tracks, and other suitable voice tracks are played, as mentioned earlier. The navigation data includes which data are to be used under what conditions, these data being taken from the files 12 through 14 storing the data for the abovementioned input outputs and the data for the voice track outputs. An example of a voice track list is as shown in FIG. 6.

The present invention is not limited to the embodiment described above but can be modified in various ways. For example, though it is mentioned in the foregoing embodiment that voice tracks are played using a male voice or female voice depending upon whether lane information is indicative of steering to the left or right, it will suffice if the quality of the voice tracks differ in accordance with the lane information.

Thus, in accordance with the invention as described above, information relating to a lane which should be entered after a turn is made at an intersection is obtained before the turn. Accordingly, even if a course requires that one turn at an intersection be immediately followed by a turn at another intersection, the driver is capable of steering the vehicle into the proper lane ahead of time to avoid making a hasty turn at the latter intersection. As a result, sudden lane changes and cutting into traffic can be avoided and it is possible for the driver to drive the vehicle at ease with sufficient time for making maneuvers.

DESCRIPTION OF APPENDIX

The attached material is an example of specific navigation data in C language to which the present invention is applied: For example:

a is a processing for setting information indicative of an intersection at which the next turn is to be made (see step ① of FIG. 1);

b is a processing step for setting the number of a voice track to be played next (see step ② of FIG. 1);

c is steps ③ and ④ shown in FIG. 1;

d is steps ⑤ and ⑥ shown in FIG. 1;

e is a routing for the above-mentioned b;

f is a routing for voice track output processing (see FIG. 2).

APPENDIX (A)

```
#include "nv.vns"
#include "dspguid.vns"
#include "retdef.vns"
#include "guidreco.nh"
#include "extern.nh"
#define NULL 0
#define CHKTIME 2000      /*20[s]*/
#define VOICETIME 400     /*5[s]*/
#define VNEARRIGHT 70
define VNEARLEFT 38 extern int TIR_TIME;

int nxtguid (gno, nnvd, nvd, restd, drc, d100m)
int gno;
unsigned nnvd;
struct nvd *nvd;
unsigned *restd;
int *drc;
unsigned d100m;
{
    int ret;
    char cname[100];
    int frmno, frm[3][2][2];
    int bcolor=0;              char btxt[30];
    unsigned vdist=0;          int vtrack=0;
    int pctno, angle;
    int f=0, f500=1;
    unsigned brestd;
    int neartrack;
    int killvoice;                              ┌ a ┌─────────────────────────────────────────────┐
│   brestd=*restd;                            │
│   pctno=nvd->pctno[0];                      │
│   angle=nvd->angle;                         │
│   strcpy(cname, &(nvd->name[0]));           │
│   GUIDSW=0;                                 │
└─────────────────────────────────────────────┘
```

```
tirqmsk(1);
if(ARIV==0) {
    while(*restd>d100m) {
        ret=intnvl();
        if(ret<=RETRESET)    return(ret);
    }
}
```

APPENDIX(B)

```
if(*restd>500) {
    GUIDSW=1;
    FPOS=1;
    aview(1);
}
else aview(gno);

if(GUIDNO!=nnvd-1) {
    if(0!=(ret=nxtcrs(gno, cname,*restd, (drc +(GUIDNO-1)*256), pctno,
    &frmno,frm))) {
        if(ret<=RETRESET)
            return(ret);
        else {
            return -1;
        }
    }
}
else {
    if(0!=(ret=neartarg(gno, cname,angle, pctno, *restd))) {
        if(ret<=RETRESET)

else aview(gno);

if(GUIDNO!=nnvd-1) {
    if(0!=(ret=nxtcrs(gno, cname, *restd, (drc+(GUIDNO-1)*256), pctno,
    &frmno,frm))) {
        if(ret<=RETRESET)
            return(ret);
        else {
            return -1;
        }
    }
}
else {
    if(0!=(ret=neartarg(gno, cname,angle, pctno,*restd))) {
        if(ret<=RETRESET)
            return(ret);
        else    return -1;
    }
    frmno=0;
    f=1;
}
```

APPENDIX (C)

```
/*tirqmsk(1); printf("NVD[GUIDNO+1].restd<=300 %d¥n", NVD[GUIDNO+1].restd);
tirqmsk(0);*/
                                                                    ┌─ b
    ┌─────────────────────────────────────────────┐
    │ setvoice(f,*restd,angle,&vdist,&vtrack);    │
    └─────────────────────────────────────────────┘ bcolor=0;
    setmem(btxt,16,0x00);

while(FCHGNV==0) {
        if(0!=(ret=mnguid(gno,0,*restd,&bcolor,btxt,frmno,frm))) {
            if(ret<=RETRESET) {
                if(FVDSP==0) {
                    tirqmsk(1);
                    if(FPOS==0) FPOS=1;
                    while(1) {
                        if(FVDSP==1) { FPOS=0;    break;}
                        tirqmain();
                    }
                    tirqmsk(0);
                }
                else
                    FPOS=0;
                return(ret);
            }
        }
                                                                    ┌─ c
    ┌─────────────────────────────────────────────────────────┐
    │ if(vdist) {                                             │
    │     tirqmsk(1);                                         │
    │     neartrack=playvoice(*restd,&vdist,&vtrack,f,angle); │
/*  │     printf("NEARTRACK == %d¥n", neartrack);*/          │
    │     tirqmsk(0);                                         │
    │ }                                                       │
    └─────────────────────────────────────────────────────────┘ if(f500==1&&*restd<500+30) {
        GUIDSW=0;
        if(brestd>500)  pippi();
        f500=0;
    } if(FVOICE&&(CVOICE>(VOICETIME/TIR_TIME))) {
        tirqmsk(1);
        cdready(1);
/*      printf("KILL VOICE¥n"); */
        killvoice=1;
        tirqmsk(0);
```

APPENDIX (D)

```
        }
        else
            FPOS=0;
        return(ret);
```

```
        }
    }
    if(vdist) {
        tirqmsk(1);
        neartrack=playvoice(*restd,&vdist,&vtrack,f,angle);
/*      printf("NEARTRACK == %d\n",neartrack); */
        tirqmsk(0);
    } if(f500==1&&*restd<500+30) {
        GUIDSW=0;
        if(brestd>500)  pippi();
        f500=0;
    } if(FVOICE&&(CVOICE>(VOICETIME/TIR_TIME))) {
        tirqmsk(1);
        cdready(0);
/*      printf("KILL VOICE\n"); */
        killvoice=1;
        tirqmsk(0);
        FVOICE=0;
    }
    ┌─────────────────────────────────────────────────────────┐ ← d
    │ if(neartrack && GUIDNO<NNVD-1 && NVD[GUIDNO+1].restd<=300) { │
    │     tirqmsk(1);                                         │
/*  │     printf("At soon, ??? iS. .\n"); */                  │
    │     if(killvoice==1) {                                  │
    │         CVOICE=0;                                       │
    │         FVOICE=1;                                       │
    │         killvoice=0;                                    │
    │         neartrack=0;                                    │
    │         if(NVD[GUIDNO+1].angle < 0)   play_i(NVEARRIGHT); │
    │         if(NVD[GUIDNO+1].angle > 0)   play_i(VNEARLEFT ); │
    │     }                                                   │
    │     tirqmsk(0);                                         │
    │ }                                                       │
    └─────────────────────────────────────────────────────────┘
    return 0;
}
```

APPENDIX (E)

```
/*#define MAIN*/
#ifdef MAIN
unsigned    VOICEDST;
char        VOICETRACK;
void main(argc,argv)
int argc;
char *argv[];
{int arriv; int angle; unsigned restd;
    if(argc<4)
    {   printf("NOW please input[arive restd angle]!!!"); exit(); }
        printf("please input [arive restd angle]!!!");exit();}
    Play_I(0);
    stcd_i(argv[1],&arive);
    stcd_i(argv[2],&restd);
```

```
    stcd_i(argv[3],&angle);
    printf("SETVOICE RET: %d\n",setvoice(arive,restd,angle));
    printf("VOICE TRACK :  %d\n",VOICETRACK);
    printf("PLAY RET    : %d\n", Play_I(VOICETRACK));
}
endif /*
    Obtain remaining distance(from RESTD) for guidance
    Set to VOICEDST
    Set guidance voice track NO. to VOICETRACK
    LEADING:    RUNNING( )
*/
/*#include "voice.vns"*/
#include "nv.vns"
#include "guidreco.nh"
#include "extern.nh"
#define NVOICE  9
#define VDELTA  10+20
```

APPENDIX(F)

```
int setvoice(arriv,restd,angle,vdist,vtrack)
    int arriv;
    int angle; /*NVD[GUIDNO].angle*/
    unsigned restd; /*RESTD*/
    unsigned *vdist;
    int *vtrack;
{   int i;

static unsigned voicedist[9]=
    {  100,    200,    300,    500,   1000,   2000,   3000   5000,   10000};
    static char voiceleft[9]={ 24,  25,  26,  27,  28,  29,  30,  31,  32,};
    static char voiceright[9]={ 49, 50,  51,  52,  53,  54,  55,  56,  57,};
    static char voiceariv[9]={ 59,  60,  61,  62,  63,  64,  65,  66,  67};

for(i=0;i<NVOICE;i++)        if(restd<voicedist[i]) break;
    if(i==0)           *vdist=voicedist[0];
    else               *vdist=voicedist[--i];
    if(arriv)          *vtrack=voiceariv[i];
    else if(angle<0)   *vtrack=voiceright[i];
    else if(angle>0)   *vtrack=voiceleft[i];
    else          {    *vdist=0;   return -1;  }
    return 0;
} int playvoice(restd,vdist,vtrack,arriv,angle)
unsigned restd;
unsigned *vdist;

int *vtrack;
    int i;

static unsigned voicedist[9]=
    {  100,    200,    300,    500,   1000,   2000,   3000,   5000,   10000}
    static char voiceleft[9]={ 24,  25,  26,  27,  28,  29,  30,  31,  32,};
    static char voiceright[9]={ 49, 50,  51,  52,  53,  54,  55,  56,  57,};
    static char voiceariv[9]={ 59,  60,  61,  62,  63,  64,  65,  66,  67};

for(i=0;i<NVOICE;i++)       if(restd<voicedist[i]) break;
```

```
if(i==0)          *vdist=voicedist[0];
else              *vdist=voicedist[--i];
if(arriv)         *vtrack=voiceariv[i];
else if(angle<0)  *vtrack=voiceright[i];
else if(angle>0)  *vtrack=voiceleft[i];
else            { *vdist=0;   return -1;  }
return 0;
}
```

APPENDIX (G)

```
int playvoice(restd,vdist,vtrack,arriv, angle)
unsigned restd;
unsigned *vdist;
int *vtrack;
int arriv;
int angle;
{   static int once=0;
    int retv=0;

if(*vdist==0)    return 0;
    if(restd<(*vdist+VDELTA)) {
        pippi();
        if(play_i(-2)==0) {
            play_i(*vtrack);
            if(*vdist>1000) {
                once=1;
                setvoice(arriv,1000+50,angle, vdist, vtrack);
            }
            else if(*vdist >300 && once)
                setvoice(arriv,300+50,angle, vdist,vtrack);
            else {
                *vdist=0;
                once=0;
                retv=1;
            }
            CVOICE=0;
            FVOICE=1;
        }
        else    setvoice(arriv, ((*vdist)-50),angle, vdist, vtrack);
    }
    return (retv);
}
```

What we claim is:

1. A navigation apparatus for navigating a vehicle in accordance with a preset course while measuring distance travelled and steering angle, comprising:
   detecting means for detecting, immediately before a first intersection, whether distance from the first intersection to a second intersection at which the next turn is to be made is less than a predetermined value;
   memory means for storing a voice track indication of lane information indicative of a lane into which the vehicle is to be steered after a turn is made at the first intersection; and
   voice track indication output means for outputting the voice track indication of said lane information on the condition that said distance detected by said detecting means is less than said predetermined value.

2. The apparatus according to claim 1, wherein said voice track indication output means outputs a voice track indication conforming to distance remaining to said first intersection as said first intersection is approached, and outputs the voice track indication of said lane information, which is indicative of the lane into which the vehicle is to be steered after the turn is made at the first intersection, after a final voice track indication outputted immediately before said first intersection.

3. The apparatus according to claim 1, wherein said voice track indication output means outputs voice track indications having a voice quality which differs depending upon the lane information.

4. The apparatus according to claim 1, wherein said voice track indication output means outputs a voice track designation conforming to a remaining distance to said first intersection and a direction of travel from said first intersection.

5. The apparatus according to claim 1, wherein said lane information is indicative of a direction in which the vehicle should be turned to approach said second intersection.

* * * * *